US009781964B1

(12) United States Patent
Davis

(10) Patent No.: US 9,781,964 B1
(45) Date of Patent: Oct. 10, 2017

(54) ILLUMINATED HEADWEAR FOR WATERSPORTS

(71) Applicant: Scott Davis, Candia, NH (US)

(72) Inventor: Scott Davis, Candia, NH (US)

( * ) Notice: Subject to any disclaimer, the term of this patent is extended or adjusted under 35 U.S.C. 154(b) by 0 days.

(21) Appl. No.: 15/145,128

(22) Filed: May 3, 2016

(51) Int. Cl.

| | |
|---|---|
| ***F21V 21/084*** | (2006.01) |
| ***B60Q 1/00*** | (2006.01) |
| ***F21V 1/00*** | (2006.01) |
| ***B60Q 3/04*** | (2006.01) |
| ***F21S 8/10*** | (2006.01) |
| ***F21V 11/00*** | (2015.01) |
| ***F21V 21/00*** | (2006.01) |
| ***F21V 29/00*** | (2015.01) |
| ***F21V 15/01*** | (2006.01) |
| ***A42B 3/04*** | (2006.01) |
| ***F21V 33/00*** | (2006.01) |
| ***F21V 3/00*** | (2015.01) |
| ***F21V 23/02*** | (2006.01) |
| ***F21L 4/08*** | (2006.01) |
| ***F21V 23/04*** | (2006.01) |
| *F21Y 101/02* | (2006.01) |
| *F21Y 113/00* | (2016.01) |

(52) U.S. Cl.
CPC .............. *A42B 3/0446* (2013.01); *F21L 4/08* (2013.01); *F21V 3/00* (2013.01); *F21V 23/02* (2013.01); *F21V 23/0414* (2013.01); *F21V 33/0008* (2013.01); *F21Y 2101/02* (2013.01); *F21Y 2113/005* (2013.01)

(58) Field of Classification Search
CPC ....... A42B 3/0466; A42B 3/044; A42B 1/244; F21V 33/0008; F21V 3/00; F21V 23/0414; F21V 23/02; F21L 4/08; F21Y 2113/005; F21Y 2101/02
See application file for complete search history.

(56) References Cited

U.S. PATENT DOCUMENTS

| | | | | |
|---|---|---|---|---|
| 5,488,361 | A * | 1/1996 | Perry | B63B 45/00 340/691.4 |
| 5,627,513 | A * | 5/1997 | Weed | B60Q 7/00 116/63 P |
| 6,017,049 | A * | 1/2000 | Spector | A42B 3/0433 2/425 |
| 6,032,293 | A | 3/2000 | Makki | |
| 6,994,445 | B1 | 2/2006 | Pomes | |
| 7,000,841 | B2 | 2/2006 | Becker | |
| 7,086,749 | B1 | 8/2006 | Hanley | |
| 7,111,956 | B2 | 9/2006 | Brown | |
| 7,722,205 | B2 | 5/2010 | Kim | |
| 8,087,801 | B2 | 1/2012 | Tseng | |

(Continued)

*Primary Examiner* — Jong-Suk (James) Lee
*Assistant Examiner* — Erin Kryukova
(74) *Attorney, Agent, or Firm* — Hayes Soloway PC

(57) ABSTRACT

An article of illuminated headwear having a top portion, a left side, and a right side, the article of headwear including a controllable power source, a lamp disposed on the top portion of the article of headwear, the lamp in electrical communication with the power source, a first lens configured to cast white light in a 360 degree pattern around the lamp, a second lens disposed on the right side of the headwear, the second lens configured to cast light of a first color to the right side of the headwear, and a third lens disposed on the left side of the headwear, the third lens configured to cast light of a second color to the left side of the headwear.

18 Claims, 6 Drawing Sheets

(56) References Cited

U.S. PATENT DOCUMENTS

| | | | | |
|---|---|---|---|---|
| 8,157,402 | B2 | 4/2012 | Huss et al. | |
| 8,733,989 | B1 * | 5/2014 | Lo | A42B 3/044 362/473 |
| 8,813,268 | B1 | 8/2014 | Fitzgerald et al. | |
| 9,013,100 | B2 | 4/2015 | Bushee | |
| 2003/0031030 | A1 * | 2/2003 | Simms | B63B 45/04 362/555 |
| 2007/0165410 | A1 * | 7/2007 | Rochfort | B63B 45/00 362/328 |
| 2010/0128468 | A1 | 5/2010 | Ong et al. | |
| 2012/0318985 | A1 | 12/2012 | Bushee | |
| 2013/0192961 | A1 | 8/2013 | Waters | |
| 2013/0198935 | A1 * | 8/2013 | Waters | A42C 5/00 2/209.13 |
| 2013/0265788 | A1 * | 10/2013 | O'Maley | B63B 45/04 362/477 |
| 2013/0329439 | A1 | 12/2013 | Hellkamp | |
| 2014/0218962 | A1 | 8/2014 | Waters | |
| 2014/0268683 | A1 | 9/2014 | Waters | |
| 2015/0250245 | A1 | 9/2015 | Waters | |
| 2015/0272252 | A1 * | 10/2015 | Munns | A42B 3/044 2/422 |

* cited by examiner

ILLUMINATED HEADWEAR FOR WATERSPORTS

FIELD OF THE INVENTION

The present invention relates to lighting equipment in general and, in particular, to illuminated headwear for use in nautical applications and watersports.

BACKGROUND OF THE INVENTION

Water safety for boaters including kayakers on the ocean or navigating a crowded port includes the use of proper lighting for avoiding collisions. Proper lighting can be as crucial as a paddle or hull when it comes to water safety for paddlers or boaters under oar power. Because of this, the United States Coast Guard has set lighting requirements that recreational boaters, including kayakers, must follow when on the water after dark or in periods of reduced visibility. The rules for boaters under sail may be similar to the rules for boaters using oar power, and the use of as much safety equipment as practical is wise, even when not legally required.

Sailing vessels may be required to carry and shine lamps combined in one lantern carried at or near the top of the mast where it can best be seen. Smaller sailing vessels and vessels under oars may exhibit the lights described, but if not, shall have ready at hand an electric torch or lighted lantern showing a white light which shall be exhibited in sufficient time to prevent collision.

Safety lighting used by non-boaters includes, for example, illuminated headwear for bicyclists. In general, the light source is mounted on the front of a helmet to assist the rider. U.S. Patent Application Publication No. 2010/0128468 discloses an illuminator device that attaches to a safety helmet for providing illumination when a user is moving.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

BRIEF SUMMARY

Figure 1:
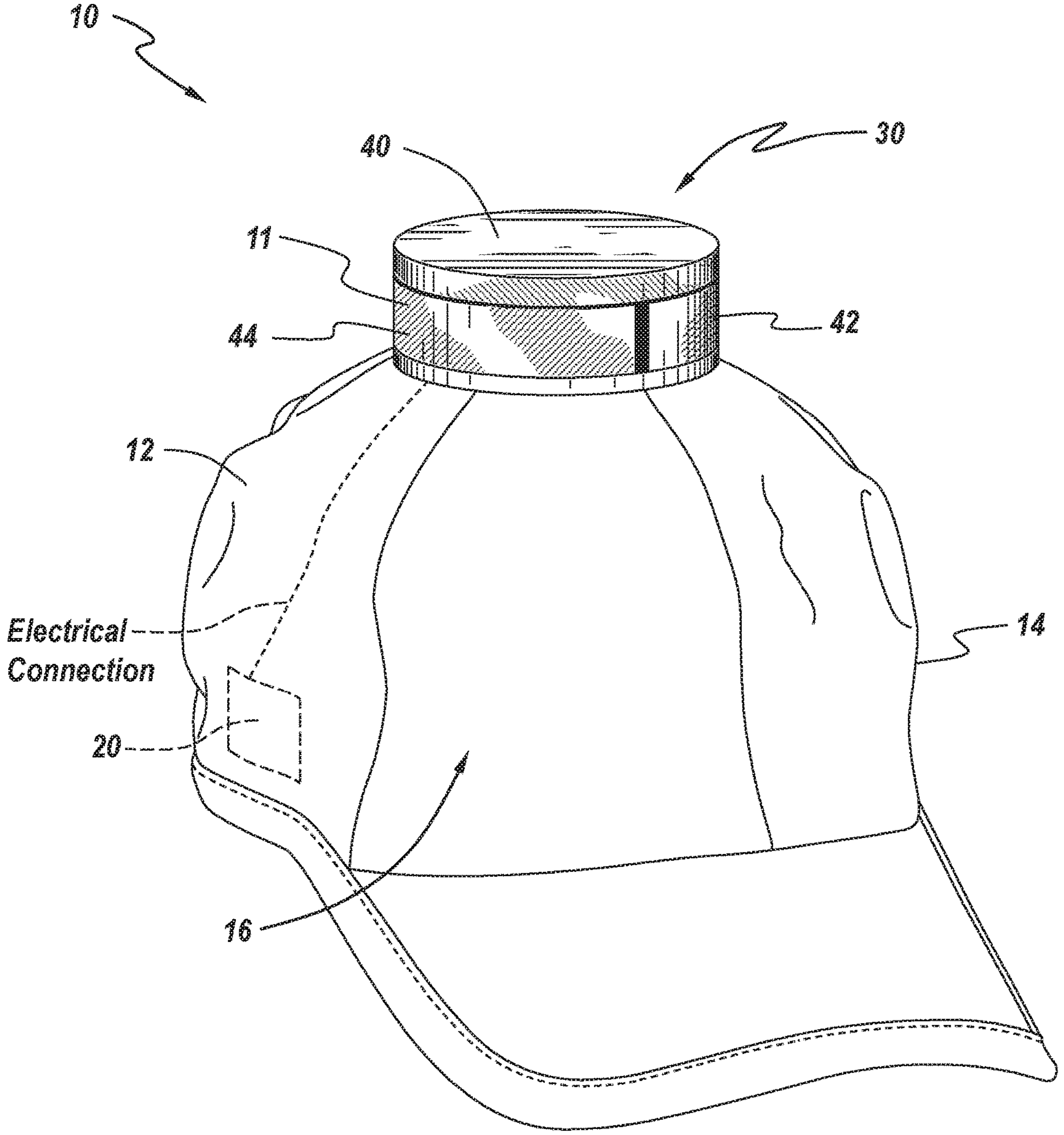
FIG. 1 illustrates a first embodiment of headwear according to the invention.

In general, a first embodiment of the invention includes an article of illuminated headwear having a top portion, a left side, and a right side, including a controllable power source, a lamp disposed on the top portion in electrical communication with the power source, a first lens configured to cast white light in a 360 degree pattern around the lamp, a second lens disposed on the right side of the headwear, the second lens configured to cast light of a first color to the right side of the headwear, and a third lens disposed on the left side of the headwear, the third lens configured to cast light of a second color to the left side of the headwear. According to some aspects, the first color may be green and the second color may be red. Also according to some aspects, the white light may be cast in a hemispherical pattern around and above the headwear and/or the headwear may include a protective helmet.

A second embodiment of the invention includes an article of illuminated headwear having a top portion, a left side, and a right side, the article of headwear including a controllable power source as in the first embodiment. However, according to the second embodiment, the headwear includes a plurality of lamps. The plurality of lamps may include a first lamp disposed on the top portion of the article of headwear in electrical communication with the power source and configured to cast white light in a 360-degree pattern around the headwear. The second embodiment further includes a second lamp disposed on the right side of the headwear in electrical communication with the power source and configured to cast light through a first colored lens to the left of the headwear. Yet further, the second embodiment includes a third lamp disposed on the left side of the headwear, the third lamp in electrical communication with the power source, the third lamp configured to cast light through a second colored lens to the right side of the headwear. According to aspects, the power source may be configured to power the first, second, and third lamps individually and/or the first and second colored lenses may be differently colored. For example, the first colored lens may be red and the second colored lens may be green. Furthermore, the headwear of the second embodiment may include a protective helmet.

According to a third embodiment, the invention includes an article of illuminated headwear having a top portion, a left side, and a right side, the article of headwear including a controllable power source, a first light source in electrical communication with the power source, disposed on the top portion of the headwear and configured to cast white light up to and including 360 degrees around the headwear. That is, the first light source may be controllable to cast light less than 360 degrees around the headwear; for example, the first light source may be controllable to cast light in 180 degrees to one of: forward of the headwear and rearward of the headwear. The third embodiment of the invention further includes a second light source disposed on the left side of headwear and configured to cast red light to the left side of the headwear and a third light source disposed on the right side of the headwear and configured to cast green light to the right side of the headwear. According to the third embodiment, the controllable power source may be configured to power the first, second, and third light sources individually. Also, according to the third embodiment, the power source may be configured to power the first, second, and third light sources individually and intermittently; for example, the intermittent powering of the light sources may be temporally patterned, and such patterning may include a distress pattern. Further, according to some aspects, one or more of the first, second, or third light sources of the third embodiment may include a plurality of individual lamps. Such individual lamps may include Light Emitting Diodes (LEDs). Yet further, according to some aspects of the invention, the third embodiment may include a protective helmet.

DETAILED DESCRIPTION

An article of illuminated headwear 10 having a top portion 12, a left side 14, and a right side 16. While a cap akin to a baseball cap is illustrated, other types of headwear are contemplated. Such types may include a protective helmet, a thermally insulated cap, etc. It is contemplated that in the case where the headwear 10 includes a protective helmet, that the helmet is adapted for use by kayakers or other water sports enthusiasts. According to some aspects, the article of headwear 10 may be integrated into the hood of a shirt or other article of clothing, such as a rain hat, without departing from the spirit of the inventive concepts.

The article of headwear 10 may include a controllable power source 20 which may be battery operated and may be powered by any number or type of batteries suitable to power the lamp(s) 30 described below. The controllable power source 20 may be solar-powered, or powered by any other appropriate means, and likewise, the optional batteries that power the power source 20 may be solar-rechargeable. The controllable power source 20 may include a switch 21 for controlling power to the lamp(s) 30.

Headwear 10 may include a lamp 30 disposed on a top portion 12 and in electrical communication with the controllable power source 20. The lamp 30 may include a single light source, such as an incandescent bulb, or the lamp 30 may include a plurality of such bulbs. Further, the lamp 30 may include a single light emitting diode (LED) or a plurality of LEDs.

Figure 5A:
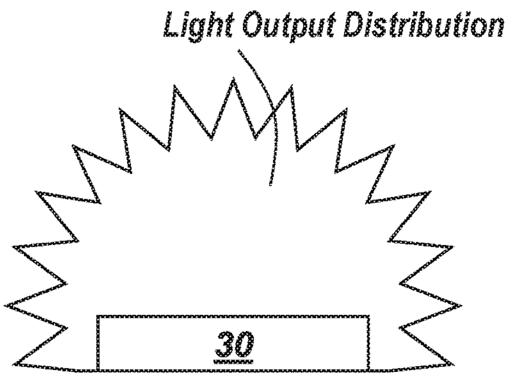
FIG. 5A illustrates an example light distribution output of a lamp for headwear configured in accordance with an embodiment of the present disclosure.
Figure 5B:
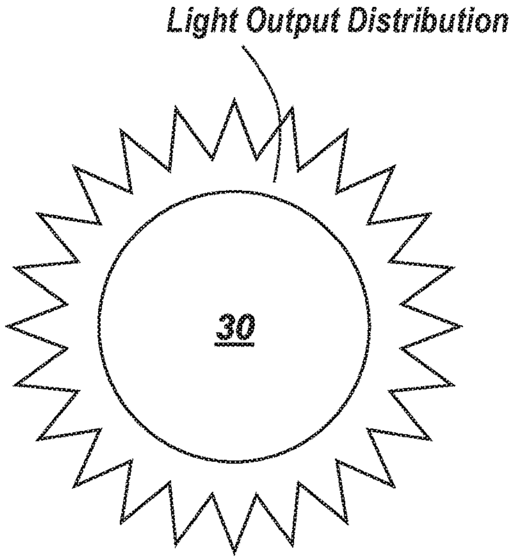
FIG. 5B illustrates an example distribution of light output of a lamp for headwear configured in accordance with an embodiment of the present disclosure.

A first lens 40 may cover the lamp 30, and the first lens 40 may be configured to allow the lamp 30 to cast white light in a 360-degree pattern around the lamp 30, such as is generally shown via FIGS. 5A-5B. Optionally, the first lens 40 may be configured to allow the lamp 30 to cast white light in a hemispherical pattern around and above the headwear 10 (e.g., as generally shown in FIGS. 5A-5B). The lamp 30 may be powerful enough to cast white light such that the light may be seen by an onlooker at least one, two, or more nautical miles away, in clear weather.

Also illustrated in FIG. 1 is a second lens 42 disposed on the right side 16 of the headwear 10. The second lens 42 may be configured to cast light of a first color to the left side 14 of the headwear 10. According to nautical tradition, light cast to the left of a moving vessel is red; however, other colors besides red are contemplated, therefore the second lens 42 may be configured to allow the lamp 30 to cast any desired color therethrough.

Further illustrated in FIG. 1 is a third lens 44 disposed on the right side 16 of headwear 10. The third lens 44 may be configured to cast light of a second color to the right side of the headwear 10. According to nautical tradition, light cast to the right side of a moving vessel is green; however, other colors besides green are contemplated, therefore the third lens 44 may be configured to allow the lamp 30 to cast any desired color therethrough.

Figure 2:
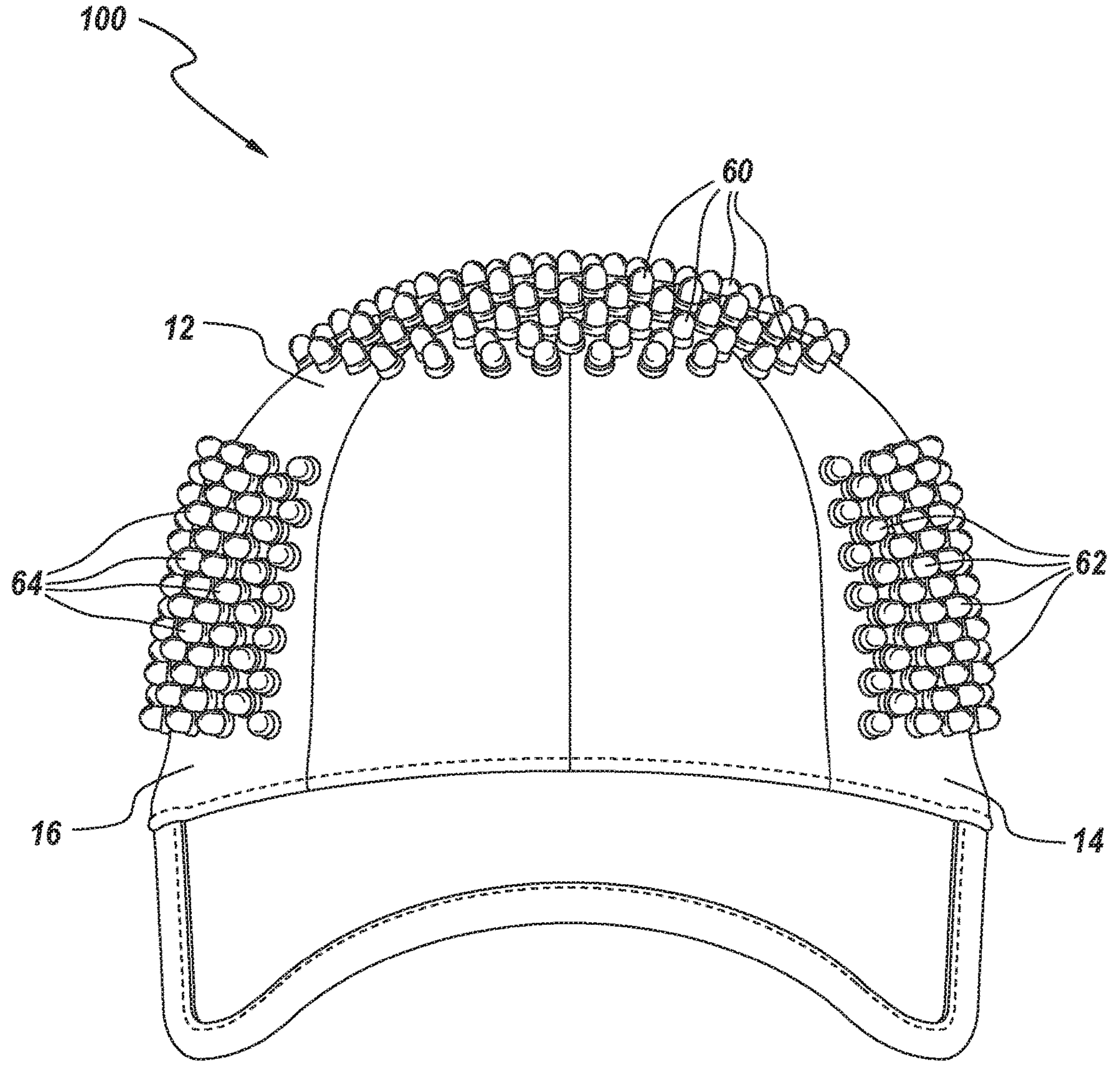
FIG. 2 illustrates a second embodiment of headwear according to the invention.

Moving on to FIG. 2, a second embodiment of the article of illuminated headwear 100 according to the invention also includes a top portion 12, a left side 14, and a right side 16. According to this second embodiment, the article of headwear 100 may also include a controllable power source 20 as discussed above. The second embodiment, however, may include one or more of a first lamp 60 disposed on the top portion 12 of the article of headwear 100, one or more of a second lamp 62 disposed on the left side 14 of the headwear 100, and one or more of a third lamp 64 disposed on the right side of the headwear 100.

According to the second embodiment, the first lamp(s) 60 are in electrical communication with power source 20 and may be configured to cast white light in up to and including a 360-degree pattern around the headwear 100. According to some embodiments, the first lamp(s) 60 may be configured to cast light in a pattern of less than 360 degrees around the headwear 100. For example, a shield or a plurality of shields may be used to prevent light from emanating in 360 degrees around the headwear 100.

Also, according to the second embodiment, the second lamp(s) 62 are disposed on the left side 14 of the headwear 100 in electrical communication with the power source 20 (illustrated in FIG. 1), and the second lamp(s) 62 may be configured to cast light through a first colored lens to the left of the headwear 100. Alternatively, the second lamp(s) 62 may include a colored LED or a plurality of colored LEDs, which may require no additional lens to cast colored light. That is, the second lamp(s) 62 may include any configuration of light sources configured to cast light of a second color. According to nautical tradition, the light cast to the left side of a moving vessel is red; however, it is contemplated that the light cast by the second lamp(s) 62 may be of any desired color(s).

The third lamp(s) 64 are disposed on the right side 16 of the headwear 100. The third lamp(s) 64 are in electrical communication with the power source 20, and the third lamp(s) 64 may be configured to cast light through a second colored lens to the right side of the headwear 100. Alternatively, the third lamp(s) 64 may include a colored LED or a plurality of colored LEDs, which require no additional lens to cast colored light. That is, the third lamp(s) 64 may include any configuration of light sources configured to cast light of a third color. According to nautical tradition, the light cast to the right side of a moving vessel is green; however, it is contemplated that the light cast by the third lamp(s) 64 may be of any desired color(s), including the same color as that cast by the second lamp(s) 62 or any different color. Further, lamps 60, 62, and 64 may be configured or programmed each to cast differently colored light. Such a configuration may be done using an appropriate processor 24 and colored lights, such as LEDs.

It should be noted that the power source 20 may be configured to power the first lamp(s) 60, the second lamp(s) 62, and third lamp(s) 64 individually. That is, a given first lamp 60 may be powered, while any of the second and third lamps 62, 64 may remain unlit. That is, any combination of lit and unlit lamps 60, 62, 64 is within the scope of the invention. Furthermore, it is contemplated that the lamps 60, 62, and 64 may be controlled to emit light in timed patterns, such as, for example, in an S.O.S. or other distress pattern.

Figure 4A:
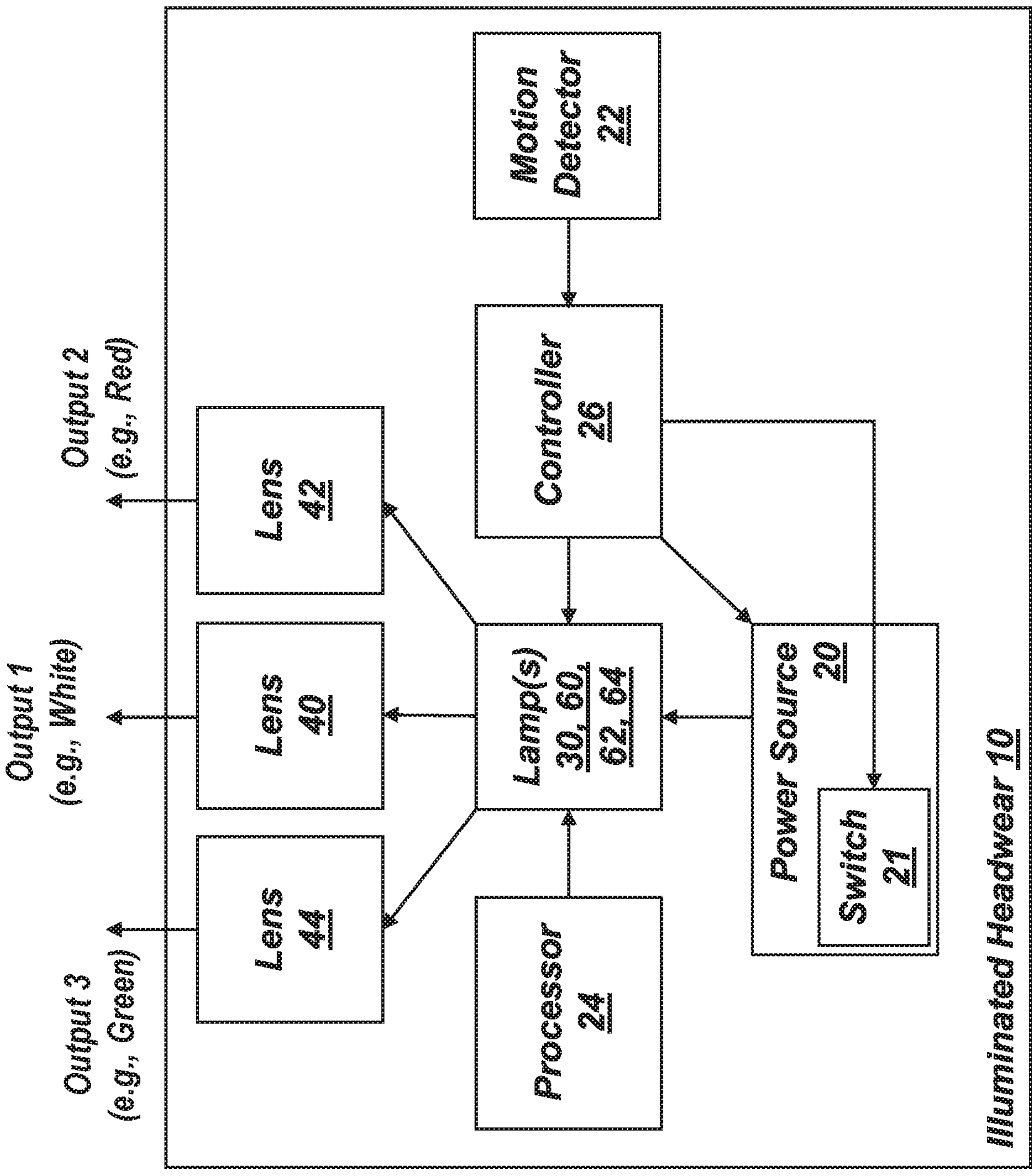
FIG. 4A is a block diagram illustrating an example of headwear configured in accordance with an embodiment of the present disclosure.
Figure 4B:
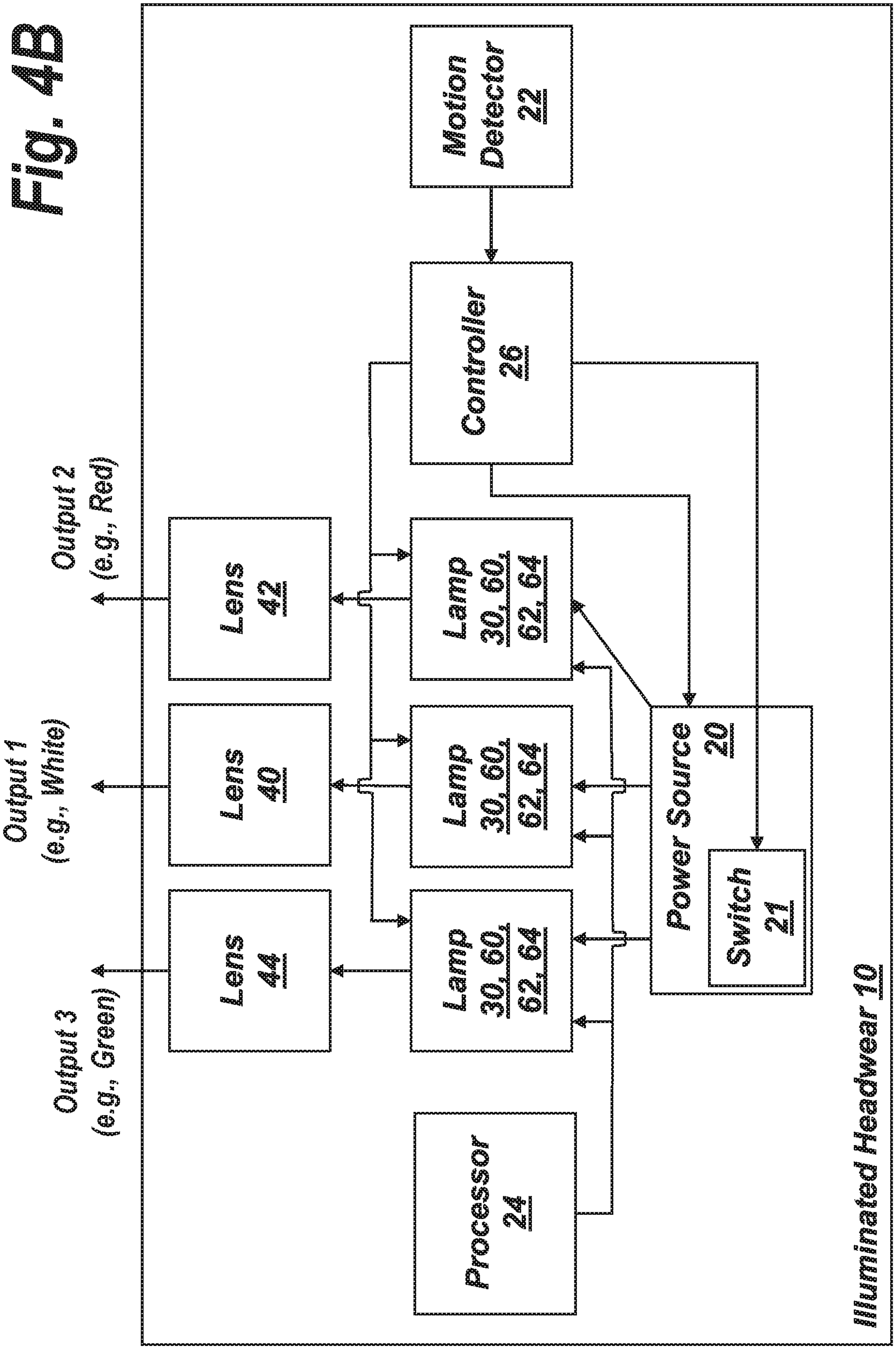
FIG. 4B is a block diagram illustrating an example of headwear configured in accordance with another embodiment of the present disclosure.

The power source 20 may include a battery compartment which may be disposed in any location on, or inside of, the headwear 10; however, the location of the power source 20 may not be critical to the operation of the lamps 30, 60, 62, 64. A battery compartment may be disposed within lamp housing 11, or attached to headwear 10, or disposed within the brim of the headwear 10, for example. The battery(ies) may be electrically connected to the lamps 30, 60, 62, 64 and to a switch 21 of the power source 20 via wires or via other appropriate electrical connections (e.g., as generally shown via FIGS. 4A-4B). According to some embodiments, the battery compartment may be covered by brim material or other headwear material, as appropriate, to conceal the battery compartment from view.

Figure 3:
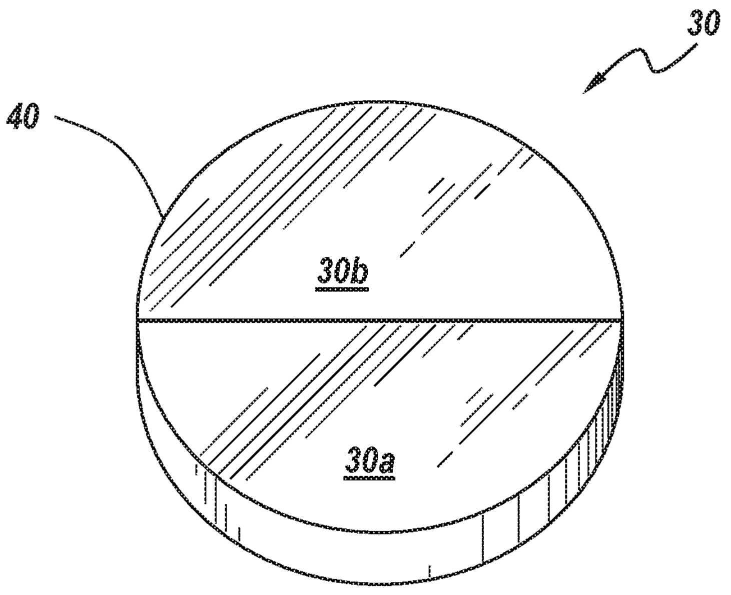
FIG. 3 illustrates an embodiment of a lamp for headwear according to the invention.
Figure 6:
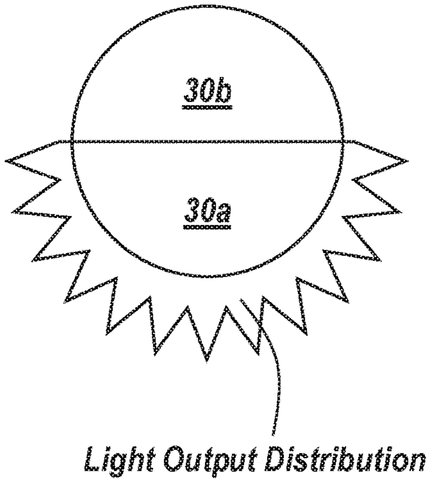
FIG. 6 illustrates an example distribution of light output of a lamp for headwear configured in accordance with another embodiment of the present disclosure.

FIG. 3 illustrates a plan view of a first lamp 30 that is configured to cast light either forward or rearward of the wearer of the headwear 10, or both. Such an alternate embodiment of the first lamp 30 may include a switch (e.g., switch 21) that is user controllable such that power to the front portion 30*a* only or the rear portion 30*b* only of the first lamp 30 may be individually selected. Further, the first lamp 30 may include one or two light shields that may be mechanically operated to shield a portion of the lens 40, such that, for non-limiting example, light is cast only to the front 180 degrees of the headwear 10 (e.g., as generally shown via FIG. 6).

The embodiments and configurations discussed above may be combined as appropriate. For example, while no single embodiment discussed included a single light source, or lamp with a single lens that may be configured to cast light in only a portion of the 360 degrees around the article of headwear 10, it is contemplated that a shield or other device may be used to cause white light to be cast in less than 360 degrees in embodiments using only a single lamp. Further, multiple shields may be used to cause light to be cast in a plurality of beams in any direction(s) around the headwear 10.

Further, it is contemplated that the headwear 10 may include a motion detector 22 that may communicate with a controller 26 to cause the colored lamps 30, 62, 64 to remain illuminated on the left and right sides of the vessel, regardless of head position of the user. That is, the red and green lamps may always be situated to port and starboard, respectively, relative to the direction of travel so when a kayak paddler, for instance, turns his head, the lights appropriately remain on the port and starboard sides, even though such lights are no longer on the right and the left sides of the head of the user. A motion detector 22 in communication with a signal mounted on the vessel, for example, at the bow, may detect which lamps must illuminate red or green such that the lamps illuminate toward the port and starboard of the vessel.

It should be emphasized that the above-described embodiments of the present disclosure, particularly, any “preferred” or “illustrative” embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

The invention claimed is:

1. An article of illuminated headwear comprising:

a power source;

a lamp disposed on a top portion of the article of illuminated headwear, the lamp configured for electrical communication with the power source and comprising:

at least one light source configured to emit light;

a first lens configured to transmit light emitted by the at least one light source as white light in a 360-degree pattern around the lamp;

a second lens disposed below the first lens on a right side of the article of illuminated headwear and configured to transmit light emitted by the at least one light source as light of a first color to the right side of the article of illuminated headwear; and a third lens disposed below the first lens on a left side of the article of illuminated headwear and configured to transmit light emitted by the at least one light source as light of a second color to the left side of the article of illuminated headwear;

wherein the second lens and the third lens are disposed adjacent one another directly below the first lens; and a controller configured to control output of the at least one light source of the lamp such that, when the article of illuminated headwear is aboard a vessel, light of the first color remains cast to a starboard side of the vessel and light of the second color remains cast to a port side of the vessel regardless of positioning of the right side and the left side of the article of illuminated headwear with respect to the vessel.

2. The article of illuminated headwear of claim 1, wherein at least one of:

the first lens is green, and the second lens is red; and the light of the first color is green, and the light of the second color is red.

3. The article of illuminated headwear of claim 1, further comprising:

a motion detector configured to detect movement of the right side and the left side of the article of illuminated headwear, wherein the controller is configured to utilize output of the motion detector in controlling the output of the at least one light source of the lamp.

4. An article of illuminated headwear comprising:

a power source;

a first lamp disposed on a top portion of the article of illuminated headwear, the first lamp configured for electrical communication with the power source and configured to cast white light in a 360-degree pattern around the article of illuminated headwear;

a second lamp disposed on a right side of the article of illuminated headwear, the second lamp configured for electrical communication with the power source and configured to cast light of a first color through a first lens to the right side of the article of illuminated headwear;

a left side of the article of illuminated headwear, the third lamp configured for electrical communication with the power source and configured to cast light of a second color through a second lens to the left side of the article of illuminated headwear; and a controller configured to control output of each of the first, second, and third lamps such that:

one of the light of the first color and the light of the second color is green;

the other of the light of the first color and the light of the second color is red;

the spatial arrangement of the output of the first, second, and third lamps complies with a recreational boating safety lighting standard; and when the article of illuminated headwear is aboard a vessel, light of the first color remains cast to a starboard side of the vessel and light of the second color remains cast to a port side of the vessel regardless of positioning of the right side and the left side of the article of illuminated headwear;

wherein the second lamp and the third lamp are disposed substantially opposite one another on the article of illuminated headwear.

5. The article of illuminated headwear of claim 4, wherein the power source is configured to power the first, second, and third lamps individually.

6. The article of illuminated headwear of claim 4, wherein the power source is at least one of solar-powered and solar-rechargeable.

7. The article of illuminated headwear of claim 4, further comprising:

a motion detector configured to detect movement of the right side and the left side of the article of illuminated headwear with respect to the vessel, wherein the controller is configured to utilize output of the motion detector in controlling output of each of the first, second, and third lamps.

8. An article of illuminated headwear comprising:

a first light source disposed on a top portion of the article of illuminated headwear and configured to cast white light up to and including 360 degrees around the article of illuminated headwear;

a second light source disposed on a left side of the article of illuminated headwear and configured to cast light to the left side of the article of illuminated headwear;

a third light source disposed on a right side of the article of illuminated headwear and configured to cast light to the right side of the article of illuminated headwear; and a controller configured to control output of each of the first, second, and third light sources such that, when the article of illuminated headwear is aboard a vessel and regardless of positioning of the right side and the left side of the article of illuminated headwear with respect to the vessel:

green light remains cast by at least one of the second light source and the third light source to a starboard side of the vessel; and red light remains cast by at least one of the second light source and the third light source to a port side of the vessel.

9. The article of illuminated headwear of claim 8, further comprising a power source configured to power the first, second, and third light sources individually.

10. The article of illuminated headwear of claim 8, wherein the controller is configured to control the first light source such that the first light source casts white light less than 360 degrees around the article of illuminated headwear.

11. The article of illuminated headwear of claim 8, wherein the controller is configured to control the first light source such that the first light source casts white light in 180 degrees to at least one of:

forward of the article of illuminated headwear; and rearward of the article of illuminated headwear.

12. The article of illuminated headwear of claim 9, wherein the power source is further configured to power the first, second, and third light sources intermittently.

13. The article of illuminated headwear of claim 12, wherein intermittent powering of the first, second, and third light sources is patterned.

14. The article of illuminated headwear of claim 13, wherein intermittent powering of the first, second, and third light sources is patterned as a distress pattern.

15. The article of illuminated headwear of claim 8, wherein at least one of the first, second, and third light sources comprises a plurality of lamps.

16. The article of illuminated headwear of claim 8, wherein at least one of the first, second, and third light sources comprises a light-emitting diode (LED).

17. The article of illuminated headwear of claim 8, further comprising:

a motion detector configured to detect movement of at least one of the right side and the left side of the article of illuminated headwear with respect to the vessel, wherein the controller is configured to utilize output of the motion detector in controlling the output of each of the first, second, and third light sources.

18. The article of illuminated headwear of claim 1, wherein the power source is at least one of solar-powered and solar-rechargeable.

* * * * *